United States Patent
De Francqueville et al.

(10) Patent No.: US 12,350,916 B2
(45) Date of Patent: Jul. 8, 2025

(54) DRAPING A SKIN OF THERMOPLASTIC MATERIAL ON A MULTICELLULAR BODY

(71) Applicant: SAFRAN, Paris (FR)

(72) Inventors: Foucault De Francqueville, Moissy-cramayel (FR); Rémi Roland Robert Mercier, Moissy-Cramayel (FR); Naoufel Ben Salem, Moissy-cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/727,591

(22) PCT Filed: Jan. 5, 2023

(86) PCT No.: PCT/FR2023/050010
§ 371 (c)(1),
(2) Date: Jul. 9, 2024

(87) PCT Pub. No.: WO2023/135381
PCT Pub. Date: Jul. 20, 2023

(65) Prior Publication Data
US 2025/0091336 A1    Mar. 20, 2025

(30) Foreign Application Priority Data
Jan. 13, 2022   (FR) .................................. 2200250

(51) Int. Cl.
*B32B 37/14*    (2006.01)
*B32B 3/12*    (2006.01)
(Continued)

(52) U.S. Cl.
CPC .............. *B32B 37/144* (2013.01); *B32B 3/12* (2013.01); *B32B 5/02* (2013.01); *B32B 27/12* (2013.01);
(Continued)

(58) Field of Classification Search
CPC .......... B32B 2607/00; B32B 2307/102; B32B 2305/18; B32B 2260/046;
(Continued)

(56) References Cited

U.S. PATENT DOCUMENTS

| | | | |
|---|---|---|---|
| 5,912,442 A | 6/1999 | Nye et al. | |
| 2004/0016595 A1* | 1/2004 | Andre | G10K 11/172 181/290 |

(Continued)

FOREIGN PATENT DOCUMENTS

GB    2314526 A    1/1998

OTHER PUBLICATIONS

Search Report and Written Opinion issued in International Application PCT/FR2023/050010, issued Apr. 20, 2023.

(Continued)

*Primary Examiner* — Vishal I Patel
(74) *Attorney, Agent, or Firm* — Bookoff McAndrews, PLLC

(57) ABSTRACT

A method for manufacturing a panel including a plurality of partitions defining cells covered by at least one skin, the skin being formed by draping fibrous structures impregnated with a thermoplastic material on the upper edges of the partitions by automatic placement of fibers, the upper edges of the partitions and the fibrous structures being joined together with the aid of a localized heating device at the moment they are placed in contact, the method wherein the fibrous structures are draped with a draping tension on the interface (Continued)

between each edge of a partition and the deposited fibrous structure applying a shear stress of between 50% and 80% of the maximum shear stress before rupture of the interface.

7 Claims, 4 Drawing Sheets

(51) Int. Cl.
    *B32B 5/02*     (2006.01)
    *B32B 27/12*     (2006.01)
    *B32B 37/06*     (2006.01)
    *B32B 37/10*     (2006.01)
    *B32B 41/00*     (2006.01)

(52) U.S. Cl.
    CPC .............. *B32B 37/06* (2013.01); *B32B 37/10* (2013.01); *B32B 37/146* (2013.01); *B32B 41/00* (2013.01); *B32B 2260/021* (2013.01); *B32B 2260/046* (2013.01); *B32B 2305/18* (2013.01); *B32B 2307/102* (2013.01); *B32B 2607/00* (2013.01)

(58) Field of Classification Search
    CPC . B32B 2260/021; B32B 41/00; B32B 37/146; B32B 37/10; B32B 37/06; B32B 27/12; B32B 5/02; B32B 3/12; B32B 37/144
    See application file for complete search history.

(56) References Cited

U.S. PATENT DOCUMENTS

| | | | |
|---|---|---|---|
| 2006/0151108 A1* | 7/2006 | St. Denis | B32B 37/206 156/308.2 |
| 2014/0027199 A1* | 1/2014 | Claeys | G10K 11/002 181/290 |
| 2018/0018952 A1* | 1/2018 | Herrera | G10K 11/161 |

OTHER PUBLICATIONS

Search Report issued in French Application No. 22 00250, issued Aug. 11, 2022.

* cited by examiner

[Fig. 1]
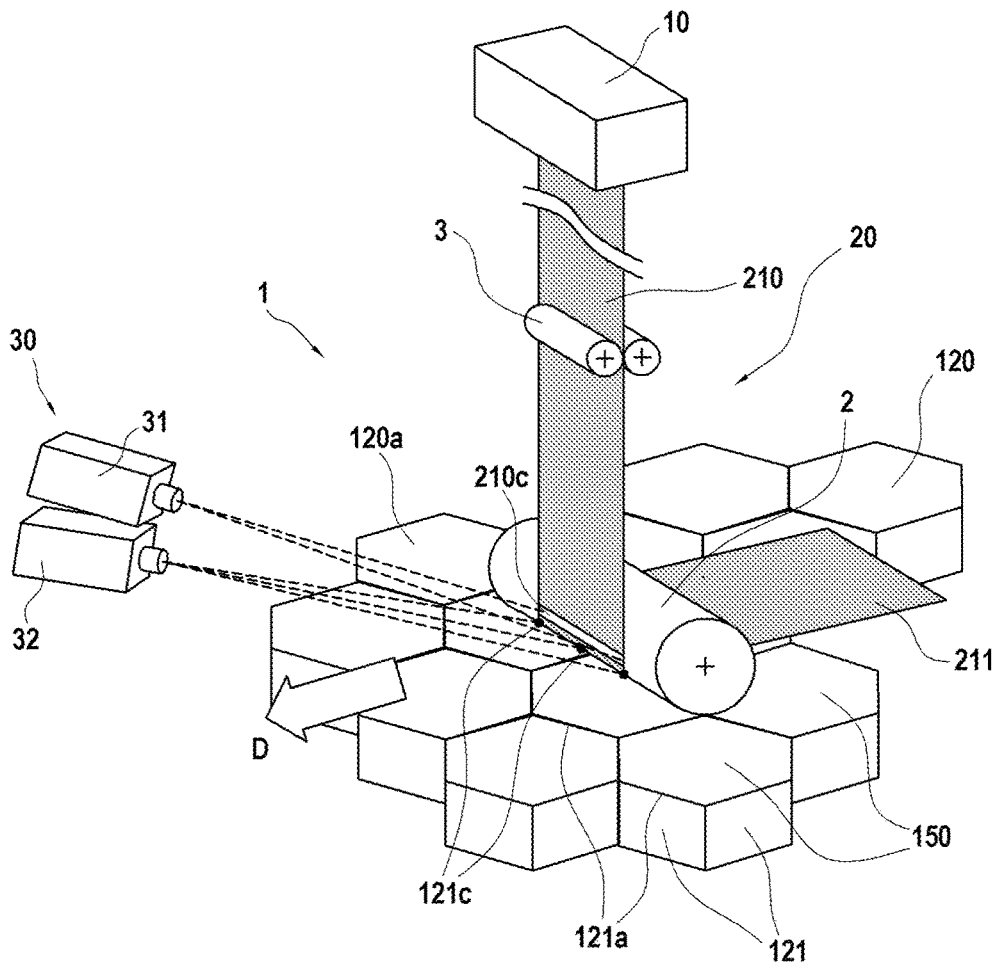
[Fig. 2]
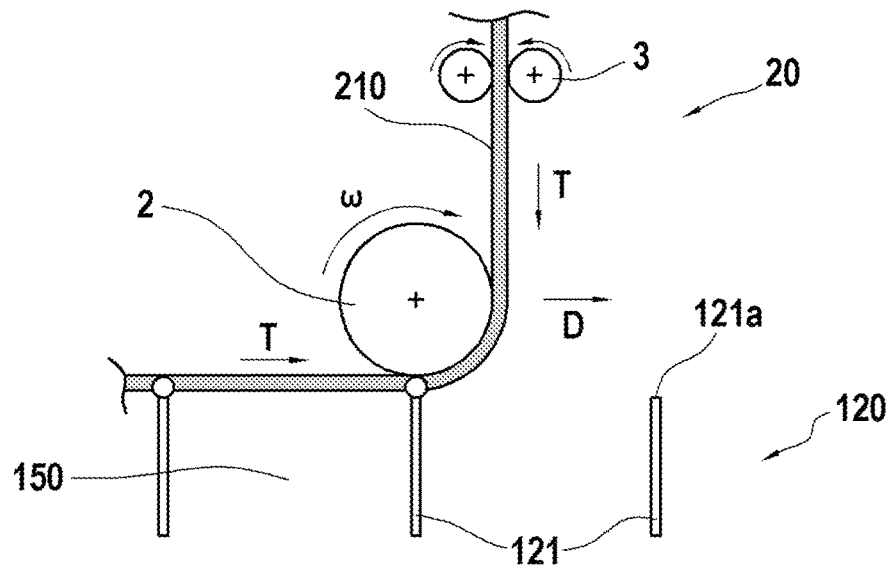

[Fig.3]
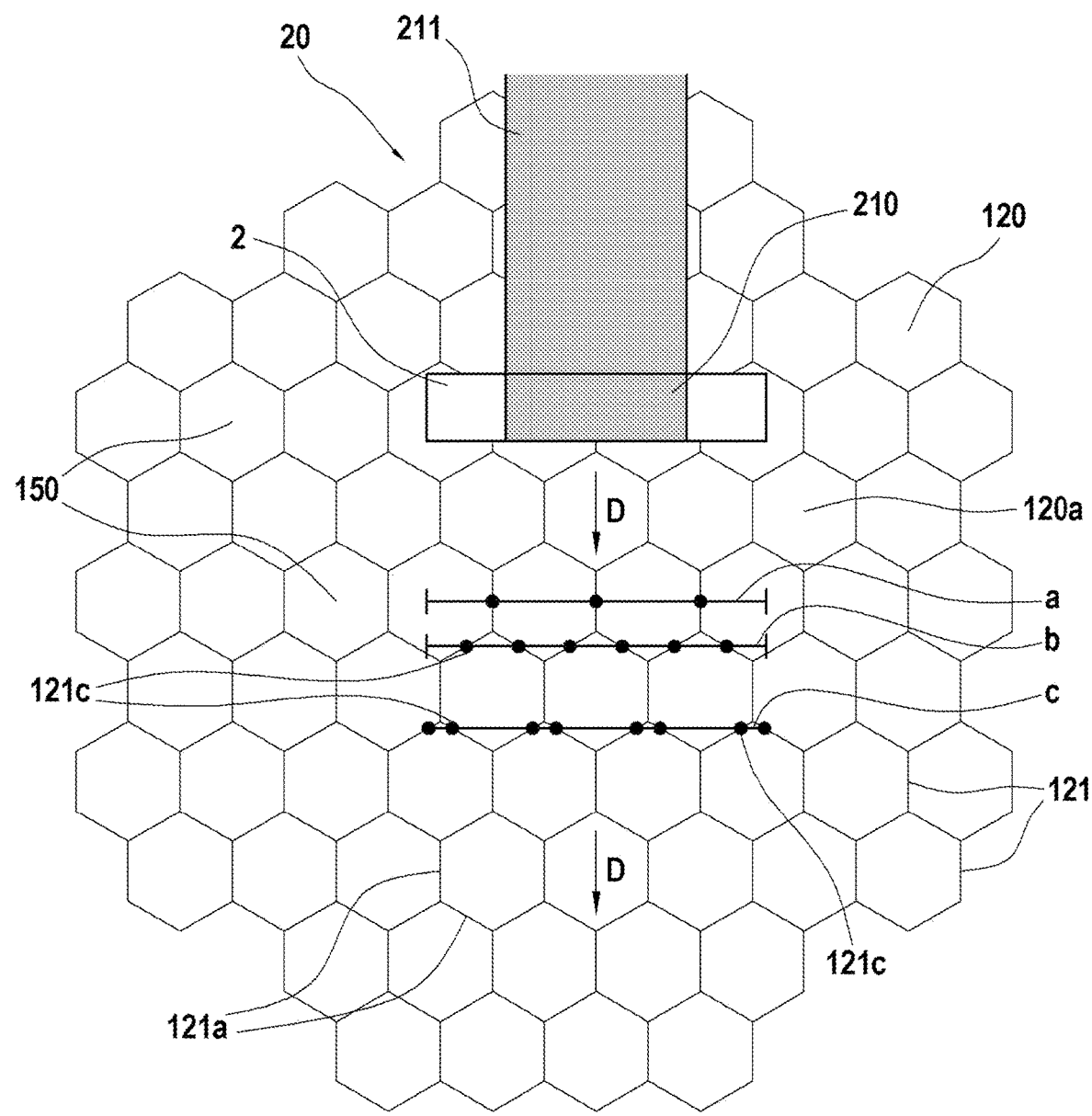

[Fig.4]
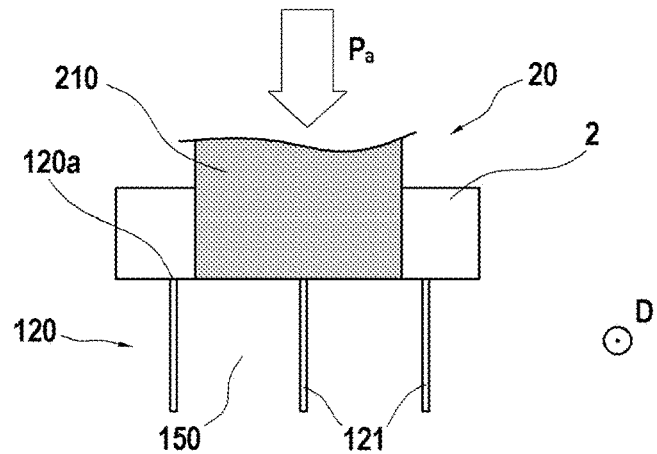
[Fig.5]
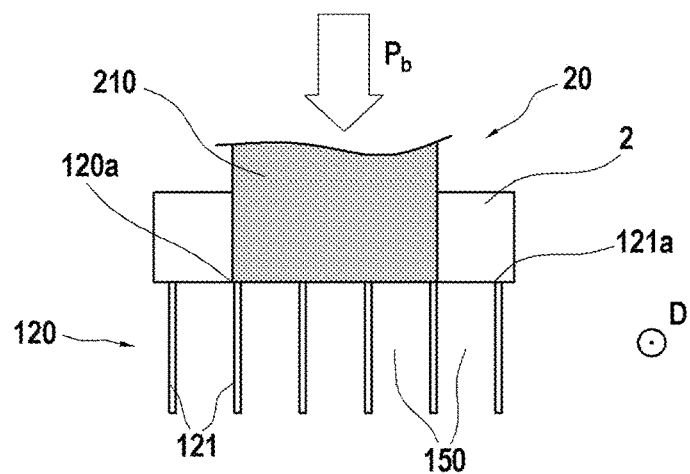
[Fig.6]
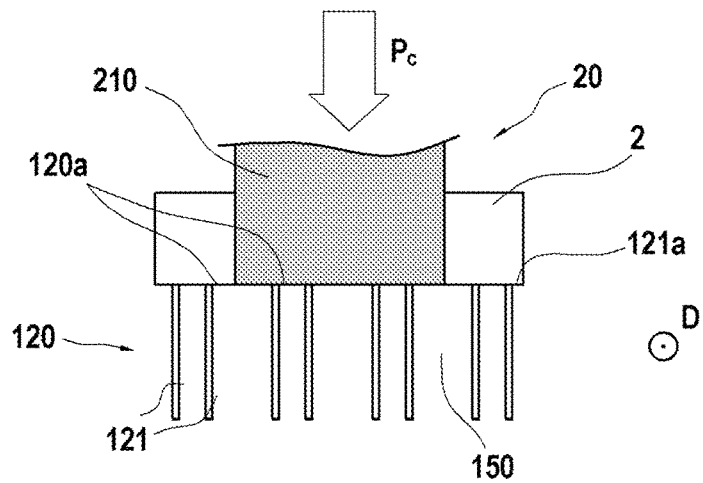

[Fig.7]
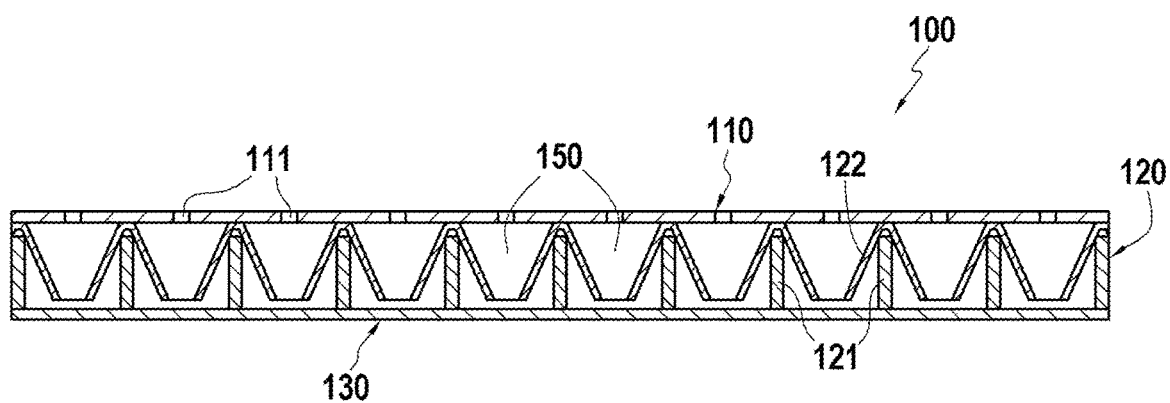

DRAPING A SKIN OF THERMOPLASTIC MATERIAL ON A MULTICELLULAR BODY

CROSS REFERENCE TO RELATED APPLICATIONS

This is a National Stage Application under 35 U.S.C. § 371 of International Application No. PCT/FR2023/050010, filed Jan. 5, 2023, now published as WO 2023/135381 A1, which claims priority to French Patent Application No. 2200250, filed on Jan. 13, 2022.

TECHNICAL FIELD

The present invention relates to the general field of draping methods by automatic placement of fibers, in particular for the manufacture of acoustic attenuation panels.

PRIOR ART

Acoustic attenuation panels are typically made up of an acoustic skin permeable to the acoustic waves to be attenuated, a full reflective skin called a "closing skin" and a multicellular body disposed between these two skins. The cell body can take the form of a plurality of partitions defining cells, for example in the shape of a honeycomb. In a well-known manner, such panels form Helmholtz type resonators which allow to attenuate acoustic waves in a certain frequency range. Acoustic attenuation panels of this type are described in particular in documents U.S. Pat. No. 5,912,442 and GB 2 314 526.

It is known to produce the skin(s) of such an acoustic panel by draping of impregnated fibrous structures on the multicellular body, using the automatic fiber placement technique, also known under the name "AFP". In particular, when the fibrous structures are impregnated with a thermoplastic material and the multicellular body is also made of thermoplastic material, this technique allows to create a strong bond between the multicellular body and the fibrous structures upon deposition. Indeed, the compaction pressure associated with a rise in temperature at the point of contact between the multicellular body and the fibrous structures allows to create a solid bond, complying with aeronautical requirements. Such a method for draping on a multicellular body is for example described in document US 2018/0018952.

However, if the technique of automatic placement of fibers is particularly suitable for draping fibrous structures on smooth and continuous surfaces, its implementation on discontinuous surfaces is more delicate. Thus, when the fibrous structures are draped over the multicellular body to form a skin, sagging of said skin in the areas located above the "voids", that is to say in the zones that are most distant from the partitions of the multicellular body is observed. This phenomenon, called "telegraphing", reduces the aerodynamics of the panel thus manufactured and reduces its mechanical strength.

DISCLOSURE OF THE INVENTION

The main purpose of the present invention is to enable the manufacture of multicellular panels comprising at least one skin by overcoming the aforementioned disadvantages.

For this purpose, the invention proposes a method for manufacturing a panel comprising a plurality of partitions defining cells covered by at least one skin of thermoplastic material, the skin being formed by draping fibrous structures impregnated with a thermoplastic material on the upper edges of the partitions by automatic placement of fibers, the upper edges of the partitions and the fibrous structures being joined together with the aid of a localized heating device at the moment they are placed in contact, the method being characterized in that the fibrous structures are draped with a draping tension on the interface between each edge of a partition and the deposited fibrous structure applying a shear stress of between 50% and 80% of the maximum shear stress before rupture of said interface.

Thus, the invention allows to apply a sufficiently high tension on the fibrous structures at the time of draping to stretch them from one partition to another in a satisfactory manner, while limiting the risks of breaking the connection between the fibrous structures and the plurality of partitions. Thus, sagging of the skin in the spaces between the partitions is reduced while maintaining a strong connection between the multicellular body and said skin. The mechanical strength of the final panel is therefore improved, and its aerodynamic properties increased.

The term "connected" can be replaced by "welded" in the case where the upper edges of the partitions are made of thermoplastic material.

It is clearly understood that the upper edges of the partitions define a continuous draping surface on which the fibrous structures are draped. Thus, preferably, the draped fibrous structures cover both the upper edges of the partitions and the spaces belonging to the cells located between the upper edges of the partitions.

According to a particular embodiment of the invention, the draping tension is produced at least in part by tensioners controlled in rotation.

According to another particular embodiment of the invention, the draping tension is produced at least in part by a roller for depositing the fibrous structures controlled in rotation.

According to another particular embodiment of the invention, the fibrous structures are draped with a compaction pressure applied by a pressure application element on the upper edge(s) of the partitions at a given instant corresponding to between 60% and 85% of the maximum pressure supported by the upper edge of a partition multiplied by the number of partitions covered by said application element at the given instant.

The pressure application element may be a deposition roller or a compaction shoe.

The compaction pressure exerted by the application element(s) at a given instant is thus adapted according to the number of partitions located under said application element at the given instant. Consequently, the compaction pressure is sufficient at all times to create a solid interface between the deposited fibrous structures and the upper edge(s) of the partitions, without being excessive in areas where the space between the partitions is large. This further limits the risk of "telegraphing", the compaction pressure exerted on the "hollow" spaces between the partitions being reduced.

According to another particular embodiment of the invention, a sensor measures the number of partitions covered by the application element.

According to another particular embodiment of the invention, the application element is controlled by a device adapting the compaction pressure applied by the application element according to the position of the application element and the overall geometric pattern formed by the upper edges of the plurality of partitions.

According to another particular embodiment of the invention, at least the upper edges of the partitions are made of thermoplastic material.

Thus, the connection between the multicellular body and the fibrous structures is made by welding two thermoplastic materials: the connection is therefore very robust.

The invention also proposes an installation for draping fibrous structures impregnated with a thermoplastic material on the upper edges of a plurality of partitions defining cells, the installation comprising at least:
- a device for supplying fibrous structures impregnated with a thermoplastic material,
- a device for depositing fibrous structures on the upper edges of the plurality of partitions,
- a localized heating device for heating the portions of the upper edges of the partitions and the portions of the fibrous structures immediately before they are placed in contact by the deposition device, the installation being characterized in that the deposition device is configured to produce a draping tension on the interface between each edge of a partition and the deposited fibrous structure applying a shear stress of between 50% and 80% of the maximum shear stress before rupture of said interface.

According to a particular embodiment of the invention, the deposition device comprises at least one pressure application element controlled on the one hand in rotation to achieve the draping tension, and on the other hand controlled in translation to achieve a compaction pressure on the upper edge(s) of the partitions at a given instant corresponding to between 60% and 85% of the maximum pressure supported by the upper edge of a partition multiplied by the number of partitions covered by said application element at the given instant.

According to a particular embodiment of the invention, the pressure application element(s) are controlled by a control device determining the compaction pressure to be applied for each application element according to the position of said application element and the overall geometric pattern formed by the upper edges of the plurality of partitions.

BRIEF DESCRIPTION OF THE DRAWINGS

FIG. 1 is a schematic view of an installation according to the invention.

FIG. 2 is a schematic sectional view of the installation of FIG. 1.

FIG. 3 is a schematic view of the positions of the pressure application element of the installation of FIG. 1 on the draping surface.

FIG. 4 is a schematic view of the first position of the pressure application element of the installation of FIG. 1.

FIG. 5 is a schematic view of the second position of the pressure application element of the installation of FIG. 1.

FIG. 6 is a schematic view of the third position of the pressure application element of the installation of FIG. 1.

FIG. 7 is a schematic sectional view of a panel produced according to the method of the invention.

DESCRIPTION OF EMBODIMENTS

FIG. 1 schematically and partially illustrates an installation 1 according to the invention for draping fibrous structures 210 on a multicellular body 120 by automatic placement of fibers. The fibrous structures 210 impregnated with thermoplastic material are thus intended to form a skin of composite material 110 or 130 with a thermoplastic matrix on the multicellular body 120, as illustrated in FIG. 7.

The multicellular body 120 comprises at least a plurality of partitions 121 which form a network of ribs, thus defining cells 150. The upper edges 121a of the partitions define a first draping surface 120a, which is thus positioned at one end of each cell 150 of the multicellular body 120.

The multicellular body can be in the form of a stack. For example, the multicellular body may comprise a stack of several pluralities of partitions each defining a cellular subbody. These stacked cell subbodies can themselves be separated by skins.

Furthermore, the cells 150 of the multicellular body 120 may comprise one or more internal structures 122, for example complex hollow acoustic elements of frustoconical or pyramidal shape, as illustrated in FIG. 7.

In the example illustrated in FIGS. 1 to 7, the multicellular body 120 has identical cells 150 of hexagonal shape, thus forming a regular structure called a "honeycomb" structure. Of course one does not depart from the scope of the invention if the cells of the multicellular body have a square, rectangular, round or the like, or even any shape. Also one does not depart from the scope of the invention if the cells of the multicellular body have variable and/or irregular shapes.

The manufacture of a multicellular body 120 is well known. For example, the multicellular body 120 can be manufactured in a well-known manner by polymer, composite or metal additive manufacturing. The multicellular body 120 can also be made of polymer, composite material, metallic material or cardboard according to conventional manufacturing methods.

Preferably, the multicellular body 120 is made of thermoplastic material. Preferably, the upper edges 121a of the multicellular body 120 belonging to the draping surface 120a are made of thermoplastic material, the rest of the multicellular body 120 possibly being made of another material. Indeed, the use of a thermoplastic material on the upper edges 121a of the multicellular body 120 intended to be in contact with the skin 110 or 130 allows to easily and quickly create a strong bond with the deposited fibrous structures 210 made of thermoplastic material. This preferred mode of connection is based on thermoplastic/thermoplastic welding, which allows to weld the fibrous structures 210 to the upper edges 121a of the partitions 121 easily and without adding additional material, thanks to a rise in temperature. The characteristics of thermoplastics during their melting or softening, depending on whether they are semi-crystalline or amorphous, allow interpenetration of their surface layers during draping at high temperature. The connection thus formed between the fibrous structures 210 and the upper edges 121a of the partitions 121 is therefore mechanically strong and durable. In particular, this type of thermoplastic/thermoplastic connection allows to produce connections that comply with aeronautical standards.

The multicellular body 120 can thus be made in a well-known manner from thermoplastic material by injection or stamping. The thermoplastic material can be filled with short fibers or with continuous fibers. The thermoplastic material may not be filled.

The multicellular body 120 can also be produced in a well-known manner by injection-compression of a filled or unfilled thermoplastic material. Injection-compression consists of injecting the material into a half-open mold. Thus, even if the material freezes, the channels become less obstructed. When the material is distributed throughout the mold, it is completely closed by a closing effort to return to the correct dimension. This allows to obtain thicknesses for the partitions 121 of the cells 150 or for the walls of the internal structures 122 that are thinner than with a conventional injection method.

The multicellular body 120 can also be produced in a well-known manner by injection with controlling the temperature of the tooling of a thermoplastic material which is filled or not. Injection with temperature control of the tooling consists in controlling the temperature of the tooling or the mold by means of a system for servo-controlling the temperature of the tooling, for example with a heat transfer fluid or with the air.

The thermoplastic materials which can be used to manufacture the multicellular body 120, and therefore the partitions 121, are in particular polyaryl ether ketones (PAEK) such as polyetheretherketone (PEEK) and polyetherketoneketone (PEKK), polyetherimides (PEI), polysulphide of phenylene (PPS) and polysulfone (PSU).

The installation according to the invention comprises a device 10 for supply with fibrous structures 210 impregnated with a thermoplastic material. The fibers of the fibrous structures 210 may be ceramic or carbon fibers. Ceramic fibers can be fibers made of non-oxide material, such as silicon carbide (SiC), or made of oxide material, such as alumina.

The fibrous structures 210 may be in the form of fibrous wicks or layers of fabric. "Wick" means a set of fibers or filaments substantially parallel to each other and united into a non-woven strip. The fibrous structures may be woven or not. Preferably, the fibrous structures 210 are rovings of pre-impregnated continuous unidirectional fibers.

The fibrous structures 210 are impregnated with a thermoplastic material, which may include solid fillers. The fibrous structures 210 can also be impregnated with a thermoplastic material not comprising solid fillers. The fibrous structures 210 can be impregnated only with an organic phase consisting of a thermoplastic material. The fibrous structures 210 may have a mass content of thermoplastic polymer greater than or equal to 30%.

The thermoplastic material impregnating the fibrous structures 210 can be chosen from: polyaryletherketones (PAEK) such as polyetheretherketone (PEEK) and polyetherketoneketone (PEKK), polyetherimides (PEI), polyphenylene sulfide (PPS) and polysulfone (PSU).

The thermoplastic material used for impregnating the fibrous structures 210 may have a glass transition temperature greater than or equal to 50° C., and preferably comprised between 80° C. and 180° C. The thermoplastic material used for impregnating the fibrous structures 210 may have a melting temperature greater than or equal to 80° C., and preferably comprised between 120° C. and 500° C. The glass transition temperature and melting temperature can be calculated by differential scanning calorimetry.

The prior impregnation of the fibrous structures 210 with the thermoplastic material can be carried out by any conventional technique, for example by dipping, by roller application or else by spraying.

The fibrous structures 210 impregnated with thermoplastic material are then conveyed from the feeding device 10 to a device 20 for depositing the impregnated fibrous structures 210. The deposition device 20 comprises at least one pressure application element 2 located on the side of the draping surface 120a of the multicellular body 120, that is to say on the side of the upper edges 121a of the partitions 121 of the multicellular body 120. This or these pressure application elements 2 each apply a compaction pressure, also called draping pressure, on the multicellular body 120 in order to achieve the deposition of the impregnated fibrous structures 210 on the draping surface 120a defined by the upper edges 121a of the partitions 121 of the multicellular body 120. The pressure application element 2 may take the form of a roller, as illustrated in FIG. 1, or may take the form of a compaction shoe.

During the draping operation, the deposition device 20 is movable in a draping direction D in order to apply the impregnated fibrous structures 210 to a first zone of the draping surface 120a of the multicellular body 120, so as to form an impregnated fibrous strip 211 on at least part of the upper edges 121a of the partitions 121. Once the application has been made on said first zone, a cutting element (not shown) cuts the impregnated fibrous strip 121. After this cutting, thus the deposition of a first fibrous strip 121 impregnated with thermoplastic material on the first zone of the draping surface 120a is obtained. The deposition device 20 can then be moved in order to deposit the impregnated fibrous structures 210 on a second zone of the draping surface 120a, distinct from the first zone.

Preferably, only one layer of impregnated fibrous structures 210 is deposited on the draping surface 120a of the multicellular body 120. Thus, the material necessary for producing the skin 110 or 130 made of composite material with a thermoplastic matrix is completely deposited in a single passage of the deposition device 20. This deposition method allows to obtain a skin 110 or 130 made of a material having good microstructural characteristics, the consolidation taking place under good conditions.

The installation 1 according to the invention further comprises a localized heating device 30. This localized heating device 30 comprises one or more elements 31 and 32 capable of heating very small portions 210c of the fibrous structures 210 during deposition, or very reduced portions 121c of the upper edges 121a of the partitions 121 being covered by the deposited fibrous structures 210. As in the example illustrated in FIG. 1, the localized heating device 30 can be a laser heating system, which allows excellent precision of the heated zone. This laser heating system can comprise laser diodes, a YAG laser or else a fiber laser.

As illustrated in FIG. 1, one or more first heating elements 31 may be used to heat the portion 210c of the fibrous structures 210 about to be draped. This or these first heating elements 31 thus ensure continuous and homogeneous heating of the deposited fibrous structures 210. Moreover, one or more second heating elements 32 can be used to heat the portion 121c of the upper edge(s) 121a of the partitions 121 about to be placed in contact with the fibrous structures 210. This or these second heating elements 32 ensure very limited heating of the upper edges 121a of the partitions 121, limiting the risks of unwanted deformation of the multicellular body 120, and in particular the risks of collapse of the multicellular body 120 due to the passage of the deposition device 20. The first and second heating elements 31 and 32 can be distinct, or combined at least in part.

In order to limit the risk of sagging of the skin 110 or 130 in the areas not supported by the partitions 121 of the multicellular body 120, a significant tension T is applied to the impregnated fibrous structures 210 at the time of deposition, as illustrated in FIG. 2. This tension T is called here "draping tension".

This draping tension T is sufficiently high to avoid sagging of the fibrous structures 210 not supported by the upper edges 121a of the partitions 121, but not too high to avoid breaking the connection between said fibrous structures 210 and the upper edges 121a of the partitions 121. Thus, the draping tension T applies a shear stress to the interface between the fibrous structures 210 and the upper edges 121a of the partitions 121 comprised between 50% and 80% of the maximum shear stress supported by said interface. This maximum shear stress can be characterized by carrying out a "single-lap shear stress" or "double-lap shear stress" type test on a thermoplastic or thermosetting interface adapted to this characterization.

This draping tension T can be achieved by various means, controlled in tension. For example, the draping tension T can be produced at least in part by means of tensioners 3. The control of said tensioners 3 can be carried out by producing a selective brake of the rotation, a motorization of the rotation or a controlled shift in transverse translation of the tensioners.

The draping tension T can also be produced at least in part by rotating the pressure application element(s) 2 described above, with a rotation speed ω. For example, the deposition roller(s) 2 can be rotated to generate a significant draping tension T, and are therefore no longer in free rotation. The pressure application element(s) 2 are controlled by means of a rotation-selective brake or by a rotating motor.

Preferably, the means used to produce the draping tension T are controlled in a closed loop, in order to ensure the desired tension values in the majority of the fibers.

In order to further reduce the risk of sagging of the skin 110 or 130 draped over the multicellular body 120, it is also possible to control the pressure $P_a$, $P_b$, $P_c$ applied by the pressure application element(s) 2 described previously on the draping surface 210a of the multicellular body 120. This pressure $P_a$, $P_b$, $P_c$ is called here "compaction pressure". The pressure $P_a$, $P_b$, $P_c$ applied by the pressure application element(s) 2 can be controlled for example by means of a cylinder, by translationally controlling the pressure application element(s) 2.

For each deposition point 121c of fibrous structures 210 on an upper edge 121a of the multicellular body 120, the direction of the compaction pressure $P_a$, $P_b$, $P_c$ is therefore perpendicular to the direction of the draping tension T.

As the draping surface 120a is not smooth but discontinuous, it is necessary to adapt the compaction pressure $P_a$, $P_b$, $P_c$ exerted by each pressure application element 2 according to the number of partition 121 edges 121a present under said pressure application element 2. As illustrated in FIGS. 3 to 6 by way of example, the application element can successively pass above three partitions 121 in a first position a illustrated in FIG. 4, then above six partitions 121 according to a second position b illustrated in FIG. 5, then above eight partitions 121 according to a third position c illustrated in FIG. 6. Thus, the first position a of the application element 2 will require applying a first compaction pressure $P_a$, the second position b of the application element 2 will require applying a second compaction pressure $P_b$, and the third position c of the application element 2 will require applying a third compaction pressure $P_c$, so that the second compaction pressure $P_b$ is greater than the first compaction pressure $P_a$ but less than the third compaction pressure $P_c$.

The number of partition 121 edges 121a present under a pressure application element 2 can be determined in real time as said application element 2 moves on the draping surface 120a, or can be predetermined from the overall geometric pattern of the draping surface 120a, formed by the upper edges 121a of the plurality of partitions 121.

The real-time determination of the number of partitions 121 present under the application element 2 can be carried out by a sensor or a specific instrument, for example by a profilometer.

A reference compaction pressure $P_{ref}$ is defined which corresponds to the maximum pressure exerted by the pressure application element 2 which is supported by a partition 121. This reference compaction pressure $P_{ref}$ is obtained from the minimum buckling limit of a partition 121 for a given local force.

Thus, a compaction pressure $P_a$, $P_b$, $P_c$ applied by each application element 2 comprised between 60% to 85% of the reference compaction pressure $P_{ref}$ multiplied by the number of partitions 121 located under said application element 2 is selected.

In the context of the example of FIGS. 3 to 6, the following formulas for the first, second and third compaction pressures $P_a$, $P_b$ and $P_c$ are thus obtained:

$$0.6 \times P_{ref} \times 3 \leq P_a \leq 0.85 \times P_{ref} \times 3;$$
$$0.6 \times P_{ref} \times 6 \leq P_b \leq 0.85 \times P_{ref} \times 6;$$
$$0.6 \times P_{ref} \times 8 \leq P_c \leq 0.85 \times P_{ref} \times 8.$$

This method for determining the compaction pressure can be adapted in the case where the multicellular body has partitions of different types, a different reference compaction pressure $P_{ref}$ being used for each type of partition.

Thus, it is possible to form a skin 110 or 130 on the upper edges 121a of the multicellular body 120, for example by carrying out a heat treatment on the fibrous structures deposited as described above to form the matrix of the composite material forming the skin 110 or 130. The method of the invention can be used for the manufacture of any type of multicellular panel 100 comprising at least one skin 100 or 130 covering the cells 150. However, the invention is particularly suitable for the manufacture of acoustic attenuation panels. The present invention can in particular allow the production of one or more skins 110, 130 of the same acoustic attenuation panel 100, including an opening acoustic skin 110, a closing acoustic skin 130 or else an intermediate acoustic skin located between two pluralities of partitions of the same panel. In the case of an opening acoustic skin 110, it is necessary to make perforations 111 in said skin to allow the passage of sound waves into the acoustic cells 150 of the panel 100.

The panel 100 manufactured according to the method of the invention can be used in the aeronautic field, and in particular to produce a multicellular panel belonging to an aeronautical engine, to a nacelle or inside a cabin.

The expression "comprised between . . . and . . . " must be understood as including the limits.

The invention claimed is:

1. A method for manufacturing a panel comprising a plurality of partitions defining cells covered by at least one skin of thermoplastic material, the skin being formed by draping fibrous structures impregnated with a thermoplastic material on an upper edges of the partitions by automatic placement of fibers, the upper edges (121a) of the partitions and the fibrous structures being joined together with the aid of a localized heating device at the moment they are placed in contact,
the method being wherein the fibrous structures are draped with a draping tension on the interface between each edge of a partition and the deposited fibrous structure applying a shear stress of between 50% and 80% of the maximum shear stress before rupture of said interface.

2. The method according to claim 1, wherein the draping tension is produced at least in part by tensioners controlled in rotation.

3. The method according to claim 1, wherein the draping tension is produced at least in part by a roller for depositing the fibrous structures controlled in rotation.

4. The method according to claim 1, wherein the fibrous structures are draped with a compaction pressure applied by a pressure application element on the upper edge(s) of the partitions at a given instant corresponding to between 60% and 85% of the maximum pressure supported by the upper edge of a partition multiplied by the number of partitions covered by said application element at the given instant.

5. The method according to claim 4, wherein a sensor measures the number of partitions covered by the application element.

6. The method according to claim 4, wherein the application element is controlled by a device adapting a compaction pressure ($P_a$, $P_b$, $P_c$) applied by the application element according to a position of the application element and the overall geometric pattern formed by the upper edges of the plurality of partitions.

7. The method according to claim 1, wherein at least the upper edges of the partitions are made of thermoplastic material.

\* \* \* \* \*